May 12, 1942. W. W. TRERICE 2,282,550
METHOD AND MACHINE FOR PRODUCING BURNISHED WORK
Filed June 14, 1939 2 Sheets-Sheet 1
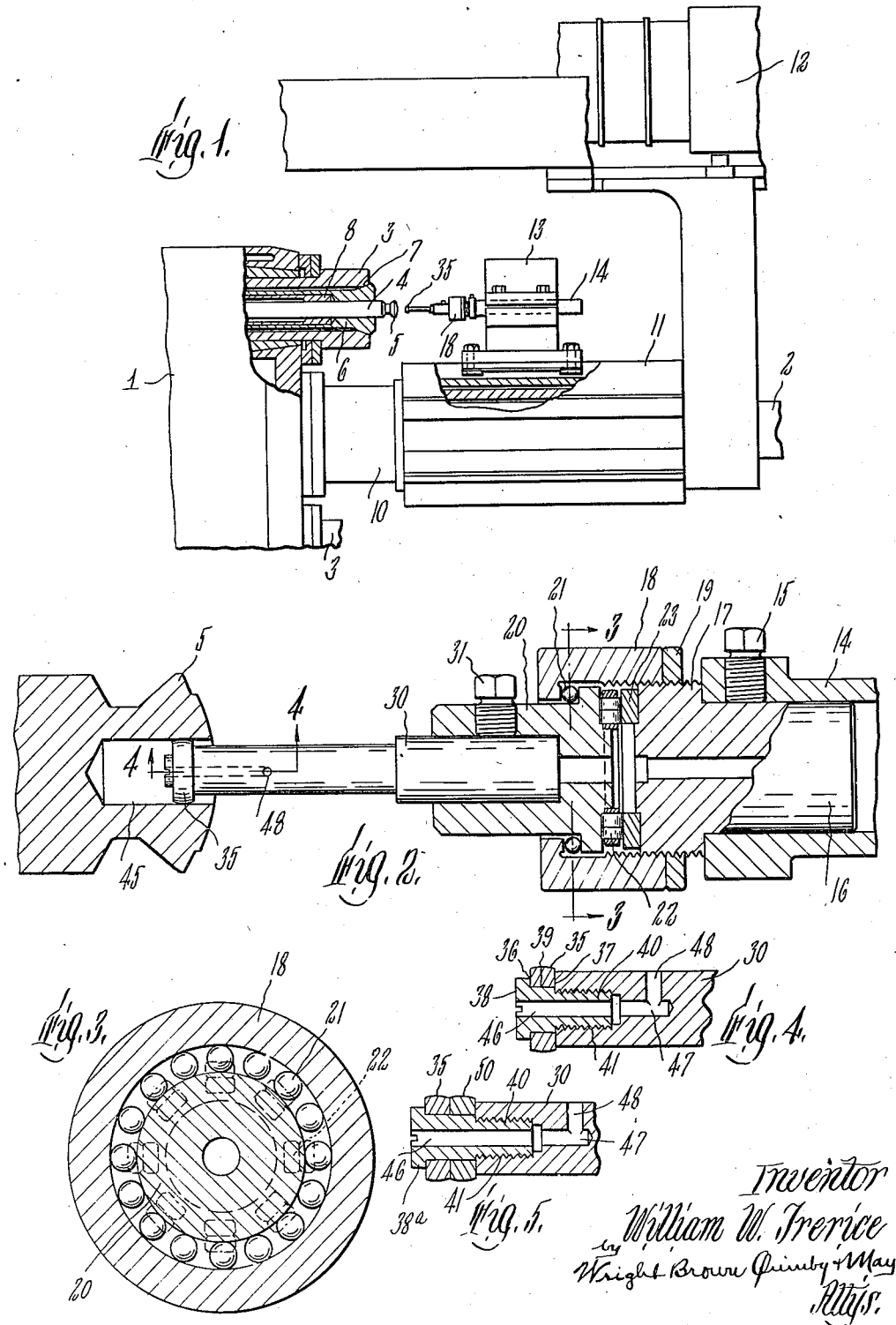

May 12, 1942.  W. W. TRERICE  2,282,550
METHOD AND MACHINE FOR PRODUCING BURNISHED WORK
Filed June 14, 1939  2 Sheets-Sheet 2

Inventor
William W. Trerice
by Wright Brown Quinby May
Attys.

Patented May 12, 1942

2,282,550

UNITED STATES PATENT OFFICE 2,282,550

METHOD AND MACHINE FOR PRODUCING BURNISHED WORK

William W. Trerice, Van Dyke, Mich., assignor to Cone Automatic Machine Company, Inc., Windsor, Vt., a corporation of Vermont Application June 14, 1939, Serial No. 279,076

21 Claims. (Cl. 29—37)

This invention relates to mechanism for burnishing the surfaces of holes in work, and has for an object to provide such a mechanism which may be used in blind holes.

It is also an object to provide mechanism for carrying out a method which includes the machining of articles from bar or tubular stock, the bar stock being bored, and whether bar or tubular stock by which the bore is burnished before the article is severed from the stock. In the case of bar stock the burnishing is done while the hole is blind. The burnishing is done by pressing the burnishing tool into the hole and then retracting it so that when the article is finally cut from the stock, the through and through bore in the article is already burnished. This method avoids the necessity of a separate handling of the bored article for a further operation after the article is cut from the stock in order to burnish its bore.

A further object is to provide a burnishing mechanism which is capable of operating on work while the work is being rotated.

A still further object is to provide such a mechanism which may be employed in connection with automatic multiple spindle lathes and screw machines at a station prior to that at which the blank or article is cut off from the length of stock.

To these ends the burnishing tool is so mounted that it can be withdrawn from the work from the same side at which it entered and so it is free to rotate with rotating work.

For a more complete understanding of this invention, reference may be had to the accompanying drawings in which Figure 1 is a fragmentary view, partly in elevation and partly broken away and in section, of a multiple spindle automatic lathe embodying mechanism of this invention.

Figure 2 is a view mostly in central section and to a larger scale than Figure 1, showing the work and the burnishing mechanism in operative relation thereto.

Figures 3 and 4 are detail sections on lines 3—3 and 4—4, respectively, of Figure 2.

Figure 5 is a view similar to Figure 4, showing a modification.

Figures 6 to 13, inclusive, are diagrammatic views illustrating operations including burnishing which may be carried out in a multiple spindle automatic lathe.

Figure 6:
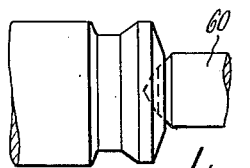
Figure 10:
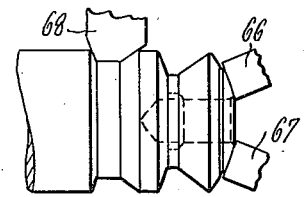
Figure 7:
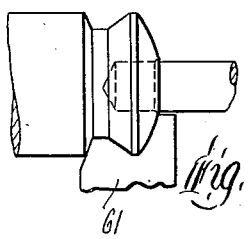
Figure 11:
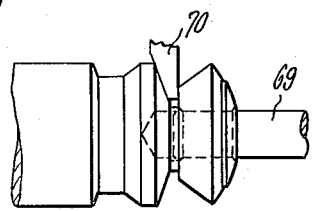
Figure 8:
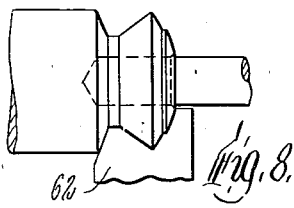
Figure 12:
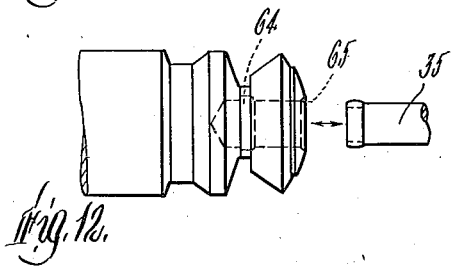
Figure 9:
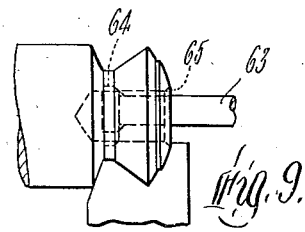
Figure 13:
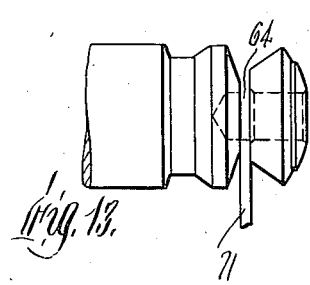
Figure 14:
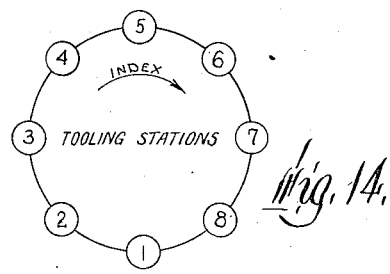

Figure 14 is a diagrammatic view of the stations corresponding to the operations shown as carried out in Figures 6 to 13, respectively.

Referring to Figure 1, the burnishing tool is shown as arranged to operate at one of the stations of a multiple spindle lathe or screw machine, which, when applied to an eight-spindle automatic lathe such as shown in the Cone Patent No. 1,934,620, granted November 7, 1933, may be at the seventh station. This machine, as shown, is provided with an indexing turret 1 indexable about the axis of a shaft 2, and carrying substantially parallel to the shaft 2, a plurality of rotatable work spindles 3 arranged in circular series about the axis of the shaft 2. The work spindles as shown are designed to support bar stock at 4, which is held clamped during machining operations on an extended end portion 5 thereof, as by a collet mechanism comprising the collet 6 which cooperates with a conical face 7 on the end of the spindle 3, for gripping the work when the collet is pulled to the left, as shown in Figure 1, and for releasing the work as the collet is moved to the right. This work may be fed through the spindle from time to time as the machining operations are completed on the extended portion thereof and the extended portion cut off, forming the blank or article, an axially movable work gripping sleeve 8 being shown for this purpose. This arrangement may be substantially according to the Cone Patent No. 2,045,070.

The shaft 2 is shown as surrounded coaxially with a sleeve 10 on which is carried a tool slide 11, and this tool slide may be moved axially of the sleeve 10 toward and from the adjacent face of the turret 1 by any suitable means such as cams on a drum 12 on an overhead cam shaft, as shown, for example, in the Cone Patent No. 2,060,975. To this slide 11 is fixed a tool carrier 13 in which is clamped the forward end of a tool-supporting sleeve 14 shown in better detail in Figure 2. Within this sleeve 14 may be clamped, as by the set screw 15 the reduced extremity 16 of a burnishing tool support 17. This support carries a housing 18 secured in position thereon as by a lock nut 19, both portions 18 and 19 being threaded on the member 17, and this housing carries a hollow shaft 20 rotatable with respect to the housing 18 and the member 17. The means for so supporting the member 20 comprises the ballbearing at 21 and a thrust roller bearing at 22, the rollers of which bear against a hardened raceway 23 carried by the end of the member 17. This member 20 may have secured therein the shank 30 of the burnishing device, which may be secured in position as by the set screw 31.

At the forward end of the shank 30 is secured the burnishing tool of larger maximum diameter than the shank. As shown in Figure 4 this burnishing tool 35 comprises a segment of a sphere, this segment being defined by end faces 36 and 37 so spaced as to leave between them a maximum diameter zone so that the burnishing tool is an equatorial segment of the sphere. The tool is thus in the form of a disk with its periphery rounded longitudinally of its axis. This segmental tool is secured in position against the outer end of the shank 30, the end face of the tool being substantially perpendicular to the length of the shank, and this may be effected by means of a screw 38 having a portion 39 extending through the tool 35 and having its inner end 40 threaded into a threaded socket 41 of the shank. This burnishing tool 35 in its maximum diameter is slightly larger than the hole which it is intended to burnish or at least not appreciably smaller than this diameter, so that it must be forced into the axial hole as shown in Figure 2, this hole being indicated at 45. The bearing support for the member 20 allows sufficient play so that the tool itself floats to an extent sufficient to permit it to be centered by its engagement in the hole in the work, and since the periphery of the burnishing tool is a portion of a sphere, the end diameters thereof are smaller than the maximum, so that the outer end portion serves as a pilot to enter the hole 45 and center the tool therein.

Since the burnishing tool makes a tight fit in the hole, a vent is provided between opposite faces of the tool so as to permit it to be pushed into the hole in blind work without obstruction from air and the lubricant necessary for the burnishing operation and which might otherwise be entrapped inwardly of the burnishing tool. To this end, the screw 38 is shown as provided with a central passage 46 which opens into the hollow portion 47 in the shank 30 and which communicates with a side port 48 leading out through the outer face of the shank member. It will thus be seen that as the slide 11 is moved toward the work, the burnishing tool may be caused to enter the hole 45 in the work at the station opposite thereto and compress the inner wall portion of the hole and give it a burnished finish. After the tool has progressed to the desired extent within the hole, it is then pulled out at the same side from which it entered by retraction of the slide 11.

In some cases it may be desired that the work of burnishing be divided between two tools and such an arrangement is shown in Figure 5 in which beside the tool 35, a second similar but slightly larger diameter tool 50 is employed, both secured to the shank member 30 as by the elongated screw 38a. The tools 35 and 50 are thus clamped together and to the shank 30 with their central axes concentric, the tool 35 doing part of the work and the tool 50 finishing it.

In Figures 6 to 14, inclusive, is shown a representative tool lay-out for an eight-spindle automatic lathe such as is shown in the Cone Patent No. 1,934,620, to which reference has already been made. This tool lay-out shows the various operations in the forming of gear blanks from bar stock, although of course the invention is not limited to the production of any specific article or blank.

Figure 14 shows the various indexed stations of the machine from one to eight, corresponding, respectively, to the disclosures of Figures 6 to 13.

Thus at station 1 the work is spot drilled as by the drill 60. At the stations 2 and 3 corresponding to Figures 7 and 8, respectively, the drilling is progressively deepened and the outer face of the stock is cut by the forming tools 61 and 62. At station 4 a back chamfer tool 63 enlarges the bore at 64 inwardly from the outer end of the blank, leaving a portion between this enlarged portion and the end chamfer 65 formed by the spot drill 60 at the first station or by the back chamfer tool in the previous cycle. At the fifth station the outer end face of the blank is burnished as by tools 66 and 67, and a side forming tool 68 starts the turning of the outer face of the next following blank. At station 6 (Figure 11) the internal bore is reamed as by the reamer 69, and the back face of the end blank and the forward face of the next blank is turned by the tool 70. At the seventh station (Figure 12), the burnishing tool is operated to burnish the bore between the chamfered portion 65 and the enlarged diameter portion 64, while in the eighth station the end blank is cut off by the cutting tool 71, cutting the blank off at the enlarged diameter portion 64. By cutting at this point no burs are left at the back end in the burnished bore of the blank, which would otherwise have to be removed by a subsequent operation.

It will be understood, of course, that these burnishing tools are hardened so as to be considerably harder than the material upon which they are to operate. They may be forced into and then retracted from rotating work, since they can rotate freely with the work by reason of their shank mounting for free rotation in the housing 18. It will also be apparent that the mounting of the member 16 may be varied from that shown, and that other suitable means may be provided for actuating the burnishing tools so as to cause them to enter and retract from the hole in the work.

It will also be evident that other changes and modifications may be made without departing from the spirit or scope of this invention as defined in the appended claims.

I claim:

1. A device of the class described, comprising a burnishing tool in the form of a disk having a periphery rounded longitudinally of its axis, and a shank to one end of which said tool is secured, said tool and shank being provided with a passage leading from the outer end of said tool, through said tool and out through said shank.

2. A device of the class described, comprising a burnishing tool shaped as a disk, its periphery being rounded longitudinally of its axis, a shank member of less diameter than the diameter of said tool abutting one end face of said tool, and a screw passed through an opening through said tool and threaded into said shank for securing said tool to said shank, said shank having a hollow portion and a hole through a side thereof communicating with said portion, and said screw having a passage therethrough communicating with said portion.

3. A device of the class described, comprising a pair of burnishing tools each shaped to a disk with its periphery rounded longitudinally of its axis, a shank member, and means for securing said tools side by side coaxial with said shank member at one end thereof, the outer tool having a maximum diameter slightly smaller than the inner tool, said tools and shank having a passage leading from the outer end of the outer tool and out through said shank back of said tools.

4. In a machine of the class described, the combination of a rotary spindle for carrying a stock bar, means for forming a blank from the stock bar having a bore, a rotatable burnishing tool having a diameter appreciably not less than the bore, means for forcing said burnishing tool into the bore, and means for cutting off the blank from the stock bar after the bore has been burnished.

5. In a machine of the class described, the combination of a rotary spindle for carrying a stock bar, means for forming a blank from the stock bar having a bore, a rotatable burnishing tool having a diameter appreciably not less than the bore, means for forcing said burnishing tool into the bore, said burnishing tool having means for the escape of air, means for rotating the bar and tool one from the other, and means for cutting off the blank from the stock bar after the bore has been burnished.

6. In a machine of the class described, the combination of a rotary spindle for carrying a stock bar, means for forming a blank from the stock bar with a blind bore, a rotatable burnishing tool having a diameter appreciably not less than the bore, means for forcing said burnishing tool into the bore, and means for cutting off the blank from the stock bar after the bore has been burnished.

7. In a machine of the class described, the combination of a rotary spindle for carrying a stock bar, means for forming a blank from the stock bar having a bore, a rotatable burnishing tool having a diameter appreciably not less than the bore, means for forcing said burnishing tool into the bore, said burnishing tool having an orifice for the escape of air, and means for cutting off the blank from the stock bar after the bore has been burnished.

8. In a machine of the class described, the combination of a rotary spindle for carrying a length of stock, means forming a blank from said stock having a bore, means for enlarging said bore spaced inwardly from the outer end of said blank, a rotatable burnishing tool having a diameter appreciably not less than the smaller diameter portion of said bore, means for forcing said tool through said smaller diameter bore portion and retracting said tool therefrom, and means for cutting off said blank from the stock at said enlarged diameter portion.

9. In a machine of the class described, the combination of a rotary spindle for carrying a length of stock, means for forming a blank from said stock having a bore, means for chamfering the outer end of said bore, means for enlarging said bore spaced inwardly from the outer end of said blank, a rotatable burnishing tool having a diameter appreciably not less than the smaller diameter portion of said bore, means for forcing said tool through said smaller diameter bore portion and retracting said tool therefrom, and means for cutting off said blank from the stock at said enlarged diameter portion.

10. The method of making a blank having a burnished bore therein which comprises in forcing a rotatable burnishing tool of a diameter appreciably not less than the bore of the blank into said bore while on its stock bar and then subsequently cutting the burnished blank from the bar upon the completion of the burnishing operation.

11. The method of making a blank having a burnished bore which comprises in forming a blank while on the bar having a bore therein, then forcing a rotatable burnishing tool into the bore thereby to burnish the bore, and then severing the burnished blank from the bar upon the completion of the burnishing operation.

12. The method of making a blank having a burnished bore which comprises in forming a blank while on the bar having a bore therein, then forcing a rotatable burnishing tool into the bore and rotating it by the rotation of the stock bar, thereby to burnish the bore, and then severing the burnished blank from the bar upon the completion of the burnishing operation.

13. The method of burnishing a blank prior to its separation from the stock which consists in forming a blank while on the bar having a blind bore therein, then forcing a rotatable burnishing tool into the bore, thereby to burnish the bore, and simultaneously effecting the escape of air with respect to said bore during the burnishing operation.

14. The method of making a blank having a burnished bore which comprises forming the blank while on the bar having a bore therein, then forcing a burnishing tool into the bore of the stock bar and simultaneously rotating the bar and burnishing tool, and then severing the completed burnished blank from the bar upon the completion of the burnishing operation.

15. The method of making a blank having a burnished bore which comprises forming the blank while on the bar having a bore therein, then forcing a burnishing tool into the bore of the stock bar and simultaneously rotating the bar and burnishing tool one from the other, and then severing the completed burnished blank from the bar upon the completion of the burnishing operation.

16. The method which comprises forming a blank from the end portion of a length of stock and provided with a bore, enlarging said bore inwardly spaced from said end portion, forcing into said bore from said end in the presence of lubricant a burnishing tool of a diameter appreciably not less than said bore between said chamfered and enlarged portions and then withdrawing said tool, and cutting off said blank at said enlarged portion of said bore.

17. The method which comprises forming a blank from the end portion of a length of stock and provided with a bore chamfered at its outer end, enlarging said bore inwardly spaced from said end portion, forcing into said bore from said end in the presence of lubricant a burnishing tool of a diameter appreciably not less than said bore between said chamfered and enlarged portions and then withdrawing said tool, and cutting off said blank at said enlarged diameter portion of said bore.

18. In a machine of the class described, the combination of means for carrying a stock bar, means for forming a blind bore therein, a burnishing tool having a diameter not appreciably less than said bore, means for rotating said carrying means, means for forcing said tool into the bore to burnish the same, and means for severing the burnished blank from the stock bar.

19. In a machine of the class described, the combination of means for carrying a stock bar having a bore therein, a burnishing tool having a diameter not appreciably less than said bore, means for rotating said carrying means, means for forcing said tool into the bore to burnish the same, means supporting said tool for free rotation with the stock, and means for severing the burnished blank from the stock bar.

20. A device of the class described, comprising a burnishing tool in the form of a disk having a periphery rounded longitudinally of its axis, and a shank to one end of which said tool is secured, said device being provided with a passage leading from the outer end of said tool, through said tool and out through said shank.

21. A device of the class described, comprising a burnishing tool in the form of a disk having a periphery rounded longitudinally of its axis, and a shank to one end of which said tool is secured, said device being provided with a passage leading from one to the other side of said disk.

WILLIAM W. TRERICE.